Jan. 20, 1942.  N. PEARCE  2,270,230
WHEEL ALIGNMENT INDICATOR
Filed Aug. 8, 1940  4 Sheets-Sheet 1
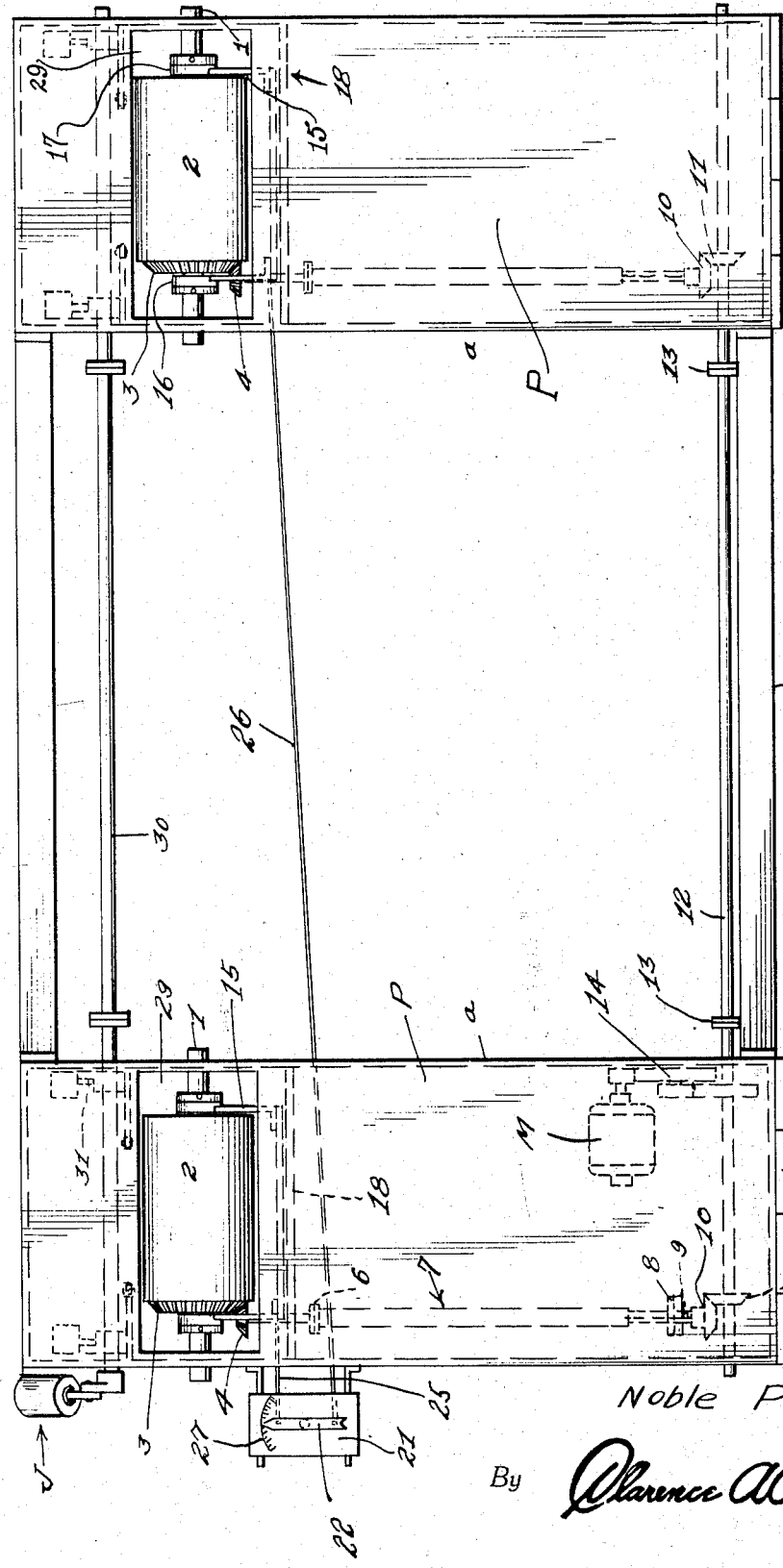
Inventor
Noble Pearce
By Clarence A. O'Brien
Attorney

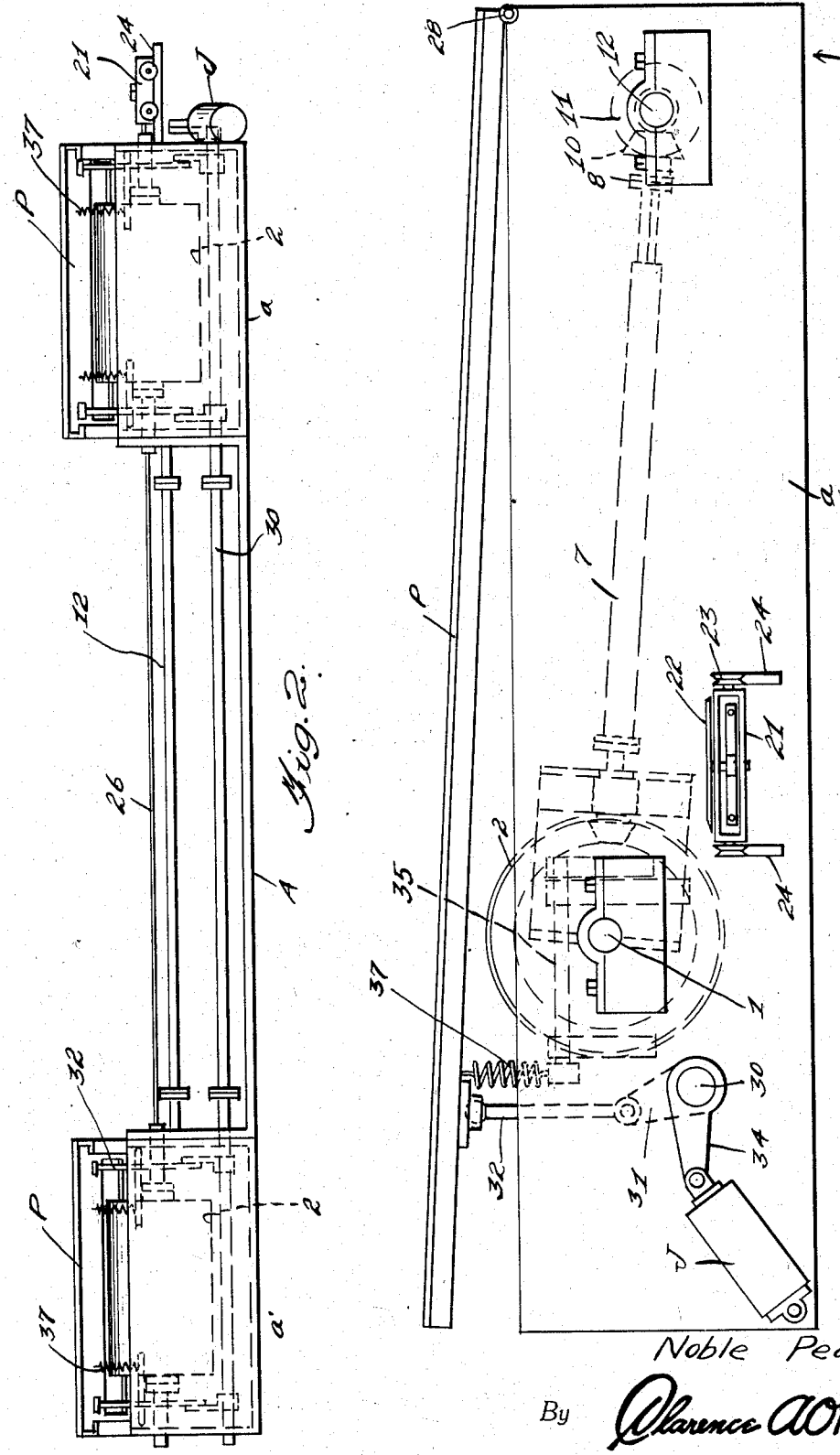

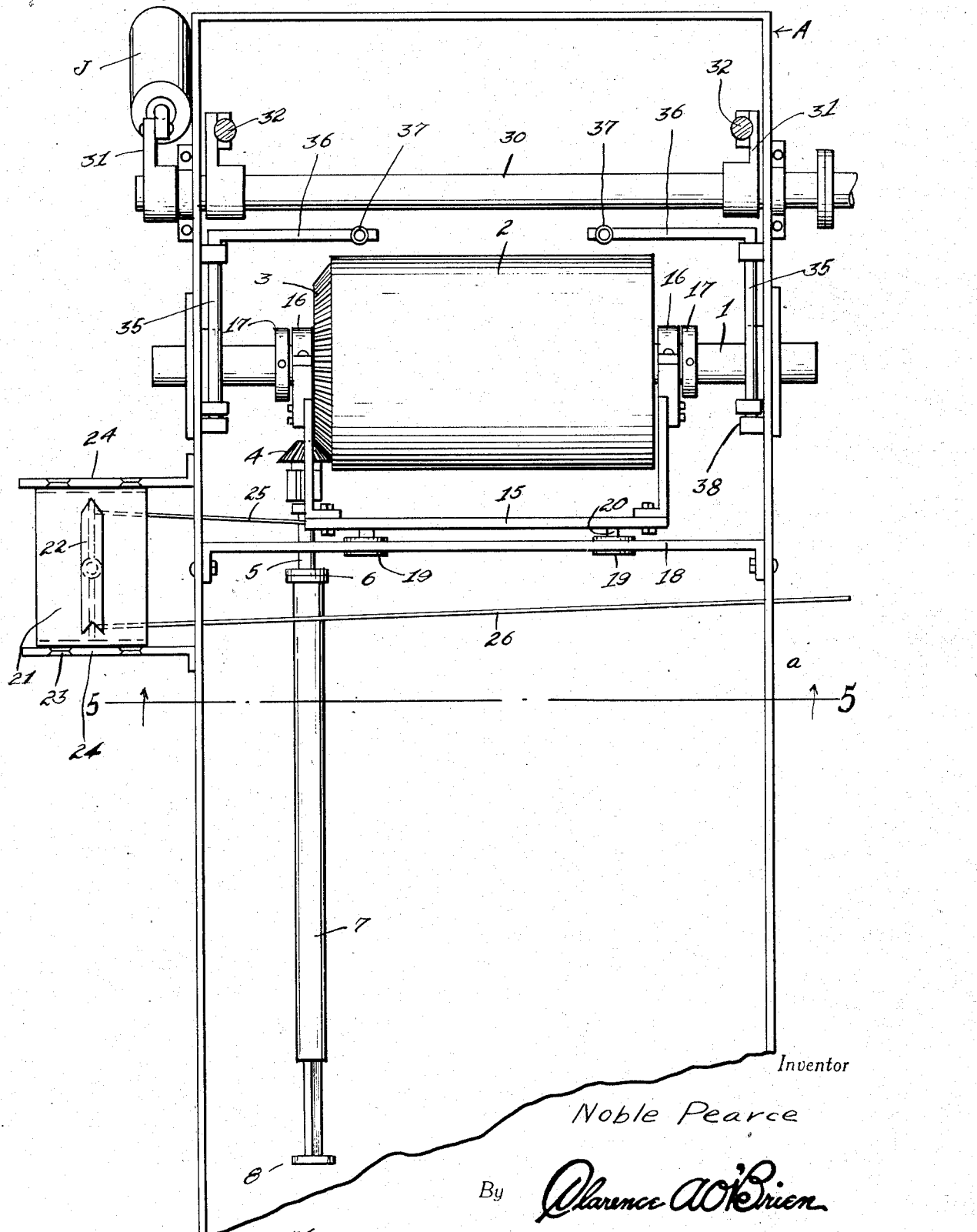

Jan. 20, 1942. N. PEARCE 2,270,230
WHEEL ALIGNMENT INDICATOR
Filed Aug. 8, 1940 4 Sheets-Sheet 4

Inventor
Noble Pearce

By *Clarence A. O'Brien*

Attorney

Patented Jan. 20, 1942

2,270,230

UNITED STATES PATENT OFFICE 2,270,230

WHEEL ALIGNMENT INDICATOR

Noble Pearce, Equality, Ill.

Application August 8, 1940, Serial No. 351,805

5 Claims. (Cl. 33—203)

This invention relates to a wheel alignment indicator, the general object of the invention being to provide means for indicating whether or not the front wheels of a motor vehicle are out of alignment and if they are whether they toe in or toe out, with means for making the tests while the front wheels are rotating and bear the weight of the vehicle.

Another object of the invention is to provide means whereby the front wheels can be raised off of the indicator operating means so that they can be adjusted and then lowered upon the operating means to see whether or not they have been properly adjusted, with means for returning the indicator operating means to normal position as soon as the wheels are raised.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of the apparatus.

Figure 2 is a front view thereof.

Figure 3 is a side view thereof.

Figure 4 is a top plan view of one side of the apparatus with the platform removed and parts omitted.

Figure 5:
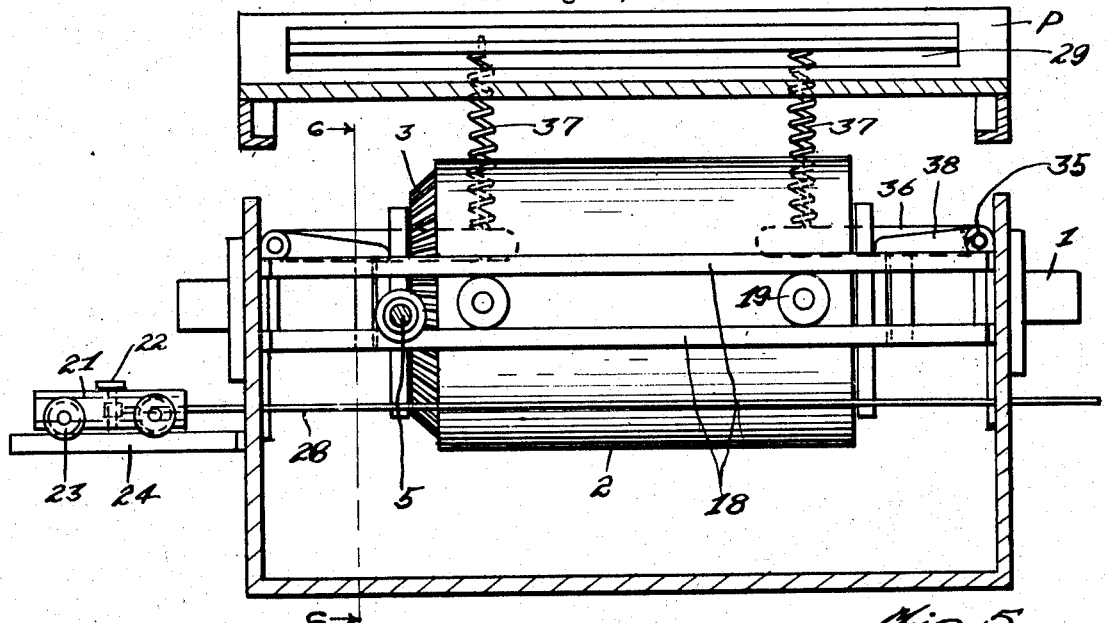
Figure 5 is a section on the line 5—5 of Figure 4 but showing the platform in raised position.

In these views the letter A indicates an elongated frame of greater length than the width of the vehicle which is to have the wheels tested and said frame includes the two side or end parts $a$ which are connected together by the beams $a'$, the parts $a$ being of open-work construction at its top but having closed sides and bottom. A shaft 1 extends transversely across the front end of each frame part $a$ and carries a roller 2 which has its periphery roughened and one end of the roller has a beveled gear 3 connected therewith which is engaged by a beveled pinion 4 carried by a shaft 5, said shaft being connected by the universal joint 6 with a telescopic shaft 7 and said telescopic shaft 7 is connected by the universal joint 8 with a shaft 9 carrying a beveled gear 10 which meshes with a similar gear 11 on a line shaft 12 journaled in the rear part of the main frame and extending through the two frame parts $a$. This shaft 12 may be formed in sections connected together by the universal joints 13 and a motor M drives this shaft 12 through means of the train of gearing 14. Thus both of the rollers 2 are driven by the motor. A saddle or yoke 15 has bearings 16 at its ends which fit over each shaft 1 adjacent the ends of each roller 2 and collars 17 are fastened to each shaft 1 and the bearings are located inwardly of these collars. Upper and lower track forming bars 18 extend across each frame part $a$ in rear of the roller and wheels 19 carried by the front axles 20 on the bight of the yoke or saddle engage these track bars as shown more particularly in Figure 5 so that the yoke or saddle is supported for sliding movement.

A casing 21 containing a rotary shaft having a finger 22 on its upper end is supported by the wheels 23 on the track members 24 extending at right angles from the outer member of one frame part $a$ and a short rod 25 connects the finger adjacent its pointed end with the adjacent yoke or saddle 15 while a long rod 26 connects the rear end of the finger with the other yoke or saddle. The pointed end of the finger is adapted to move over an arcuate scale 27 on the top of the casing.

Figure 6:
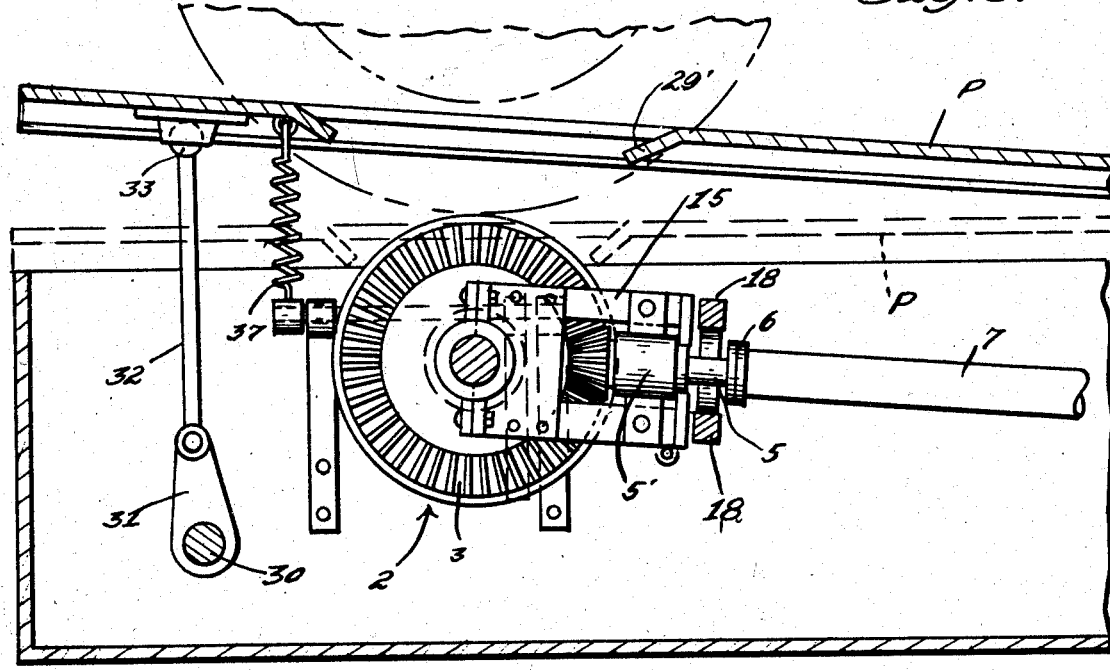
Figure 6 is a section on the line 6—6 of Figure 5.

A platform P is provided for each frame part $a$ and is hinged at its rear end to the frame part as shown at 28 and said platform extends over the roller 2 where it is formed with an opening 29 which exposes the roller and permits a vehicle wheel to contact the roller as shown in Figure 6 when the platform is in lowered position.

A shaft 30 extends across the front of the main frame and has the arms 31 connected therewith, there being a pair of arms for each platform and rods 32 are pivotally connected with the arms 31 and the upper ends of the rods are connected by the universal joints 33 with the under part of the front end of the platform. A hydraulic jack J is supported by a part of the main frame and has its piston rod connected to an arm 34 on the shaft 30 so that when the jack is actuated it will rock the shaft 30 and cause the arms 31 and the rods 32 to lift the two platforms well above the rollers 2 so that the front wheels of the vehicle are lifted off the rollers.

A pair of longitudinally extending shafts 35 is supported for rocking movement by each frame part $a$ there being a shaft adjacent each end of the shaft 1 and a right angle arm 36 extends from the front end of the shaft 35 and is connected by a spring 37 to a platform and a second arm 38 is connected to the other end of each shaft 35 and these second arms will engage the end parts of the yoke or saddle 15 when the platform is raised so as to move the roller 2 to its neutral or central position so that the rollers are reset each time the platforms are raised by the hydraulic means.

As shown in Figure 6 the end walls of the opening 29 in each platform are turned downwardly as at 29' to conform to the wheel and each shaft 5 has its bearing 5' in the outer limb of the yoke or saddle 15.

In using the device the front wheels of the vehicle are run over the platforms P until the front wheels partly pass through the openings 29 and rest upon the rollers 2. The motor M is then started so as to rotate the rollers 2 and if the front wheels are out of alignment they will cause the rollers to move longitudinally in one direction or the other. If the wheels have too much "toe" then the rollers move apart and this will cause the short rod 25 to push upon the finger 22 as the saddle 15 moves to the left of Figure 4 while the long rod 26 moves to the right while the saddle of the right hand roller 2 will pull upon the rear part of the finger. Thus the indicator signal will be moved in one direction and the scale will indicate to what degree the wheels are out of alignment. If the wheels do not have enough "toe" the rollers will move toward each other and the effect on the indicator will be the reverse of that just described so that the indicator hand will be moved in the opposite direction. Thus the indicator means will indicate whether or not the wheels are out of alignment and to what extent and whether they "toe" outwardly or inwardly too much. Of course, if the rollers do not move longitudinally then this will show that the wheels are correctly aligned. If they are out of alignment and the indicator means show that they are then the jack J is operated to raise the two platforms so as to raise the wheels off the rollers. As before stated as the platforms are raised the rollers 2 are reset by the shafts 35 and the arms 38. Then the wheels can be adjusted after which the platforms are lowered to place the wheels back upon the rollers and then the rollers are rotated to see whether or not the wheels have been properly adjusted.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A wheel alignment indicator comprising a frame, a roller supported for axial movement in the frame and adapted to have the front wheel of a vehicle engage the roller, indicating means, means actuated by axial movement of the roller by the wheel of a vehicle for actuating the indicating means, for indicating the amount the wheel is out of alignment, a pair of arms for engaging the ends of the roller for holding the same midway in its path of axial movement and means for moving the arms out of operative position to permit axial movement of the roller.

2. An apparatus of the class described comprising a frame, a pair of axially aligned rollers rotatably supported in the frame and supported for axial movement, platforms having openings therein for exposing the rollers and permitting the front wheels of a vehicle to rest upon the rollers and to rotate the rollers when the wheels are rotated, said rollers being moved axially by the rotating wheels of a vehicle if such wheels are out of alignment, indicator means, means actuated by axial movement of the rollers for actuating the indicating means, and means for raising the platforms to lift the vehicle wheels off the rollers.

3. A wheel alignment indicator comprising a frame, a pair of axially aligned rollers rotatably supported in the frame and also supported for axial movement, a platform means supported by the frame and having openings therein exposing the rollers and permitting the front wheels of a vehicle to rest upon the rollers, motor driven means for rotating the rollers, yokes slidably supported in the frame and having parts engaging the ends of the rollers, an indicator including a finger, a member connecting one yoke with one end of the finger, a member connecting the other end of the finger with the other yoke, said finger being pivotally supported intermediate its ends, hydraulic means for raising the platform and means operated by the raising of the platform means for moving the rollers to a midway position in the paths of the axial movements.

4. A wheel alignment indicator comprising a frame, a pair of aligned rollers in the frame supported for rotary and axial movement, platforms hinged at one end of the frame and having holes therein for permitting the front wheels of a vehicle to rest upon the rollers, said front wheels if out of alignment moving the rollers axially when the wheels are rotated, hydraulic means for raising the platforms, a pair of yokes supported for sliding movement in the frame and moved by axial movement of the rollers, an indicator casing, means for slidably supporting the same for movement toward and away from the rollers, a finger pivoted to the indicator casing intermediate its ends, a rod connecting one end of the finger to one yoke and a rod connecting the other end of the finger to the other yoke.

5. A wheel alignment indicator comprising a frame, a pair of axially aligned rollers in the frame supported for rotary and axial movement, platforms hinged at one end of the frame and having holes therein for permitting the front wheels of a vehicle to rest upon the rollers, said front wheels if out of alignment moving the rollers axially when the wheels are rotated, hydraulic means for raising the platforms, a pair of yokes supported for sliding movement in the frame and moved by axial movement of the rollers, an indicator casing, means for slidably supporting the same for movement toward and away from the rollers, a finger pivoted to the indicator casing intermediate its ends, a rod connecting one end of the finger to one yoke and a rod connecting the other end of the finger to the other yoke, arms moving into engagement with the yokes of each roller when the platforms are raised, such arms holding the roller in a position midway in the path of its axial movement and means for moving the arms out of engagement with the yokes as the platforms move downwardly.

NOBLE PEARCE.